US006792279B2

United States Patent
Komatsu

(10) Patent No.: US 6,792,279 B2
(45) Date of Patent: Sep. 14, 2004

(54) MOBILE TERMINAL FOR TRANSMISSION DIVERSITY CDMA COMMUNICATION SYSTEM

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 09/845,161

(22) Filed: May 1, 2001

(65) Prior Publication Data

US 2001/0046873 A1 Nov. 29, 2001

(30) Foreign Application Priority Data

May 18, 2000 (JP) ........................................ 2000-146751

(51) Int. Cl.$^7$ .......................... H04B 15/00; H04B 7/005
(52) U.S. Cl. ...................... 455/506; 455/520; 455/561
(58) Field of Search ................................ 455/506, 520, 455/561, 501, 101, 423, 513, 515, 522, 69; 370/335, 342

(56) References Cited

U.S. PATENT DOCUMENTS

| | | | |
|---|---|---|---|
| 6,295,289 B1 * | 9/2001 | Ionescu et al. | 370/342 |
| 6,377,812 B1 * | 4/2002 | Rashid-Farrokhi et al. | 455/522 |
| 6,600,772 B1 * | 7/2003 | Zeira et al. | 375/130 |
| 2002/0126640 A1 * | 9/2002 | Komatsu | 370/335 |

FOREIGN PATENT DOCUMENTS

| | | |
|---|---|---|
| DE | 198 24 152 A1 | 12/1999 |
| JP | 6-152494 A | 5/1994 |
| JP | 7-226709 | 8/1995 |
| JP | 8-195703 | 7/1996 |
| JP | 10-336144 | 12/1998 |
| JP | 11-112419 | 4/1999 |
| JP | 11-275035 | 10/1999 |
| JP | 2000-19663 A | 2/2000 |
| WO | 99/26423 | 5/1999 |

* cited by examiner

Primary Examiner—Nay Maung
Assistant Examiner—Edan Orgad
(74) Attorney, Agent, or Firm—Sughrue Mion, PLLC

(57) ABSTRACT

The mobile terminal of the present invention receives signals from the base station which receives the control command from the mobile terminal and executes, on the basis of the control command, the antenna switching transmission diversity. The mobile terminal includes: a reception unit for receiving downward signal from the base station; a downward link estimation unit for estimating the downward link on the basis of the received downward signal; an upward link estimation unit for estimating the upward link on the basis of the received downward signal; a base station estimation unit for estimating a state of the base station on the basis of the outputs from the downward estimation unit and the upward estimation unit; and a demodulator unit for demodulating the received signal on the basis of the output from the base station estimation unit.

2 Claims, 6 Drawing Sheets

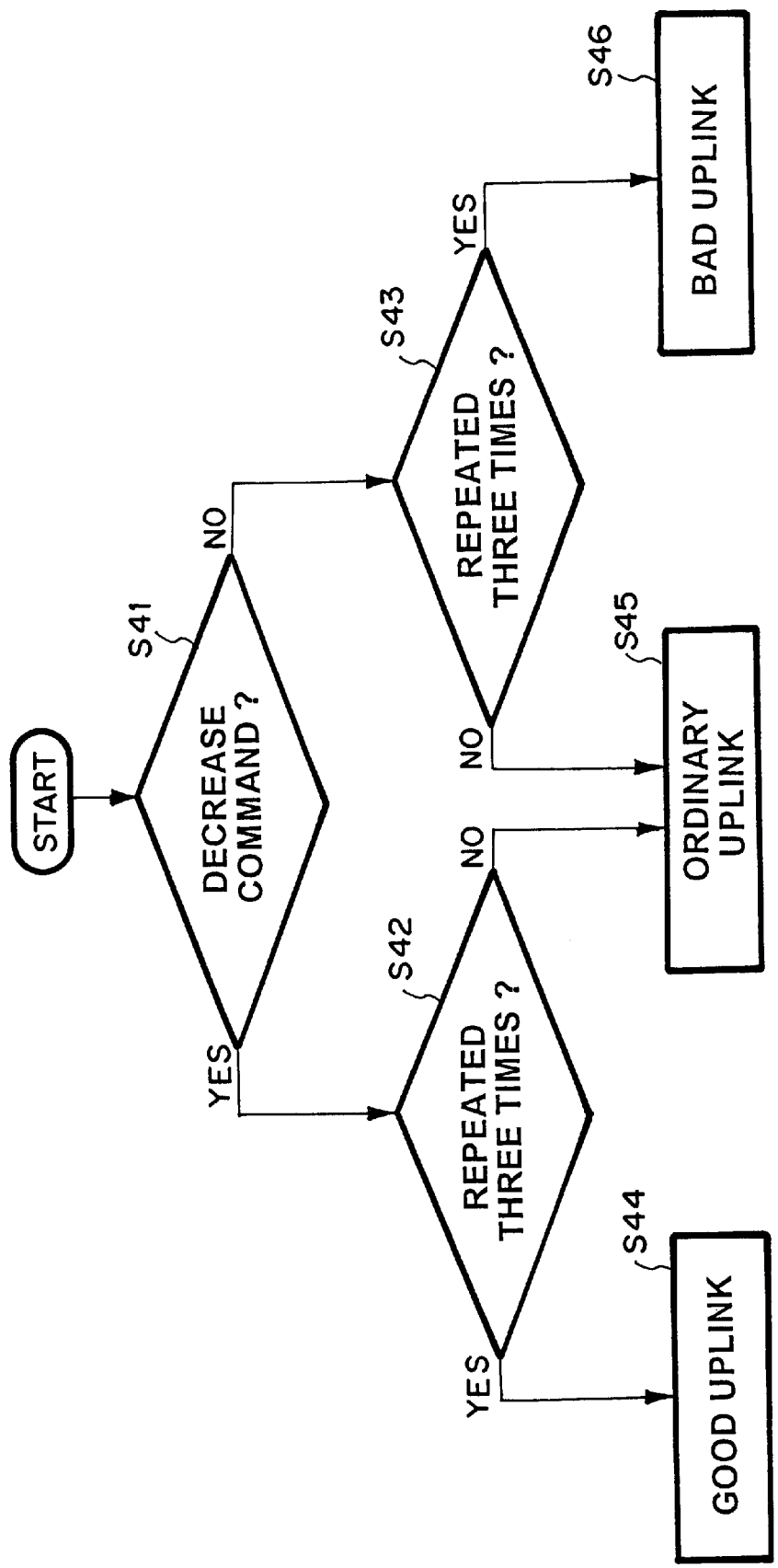

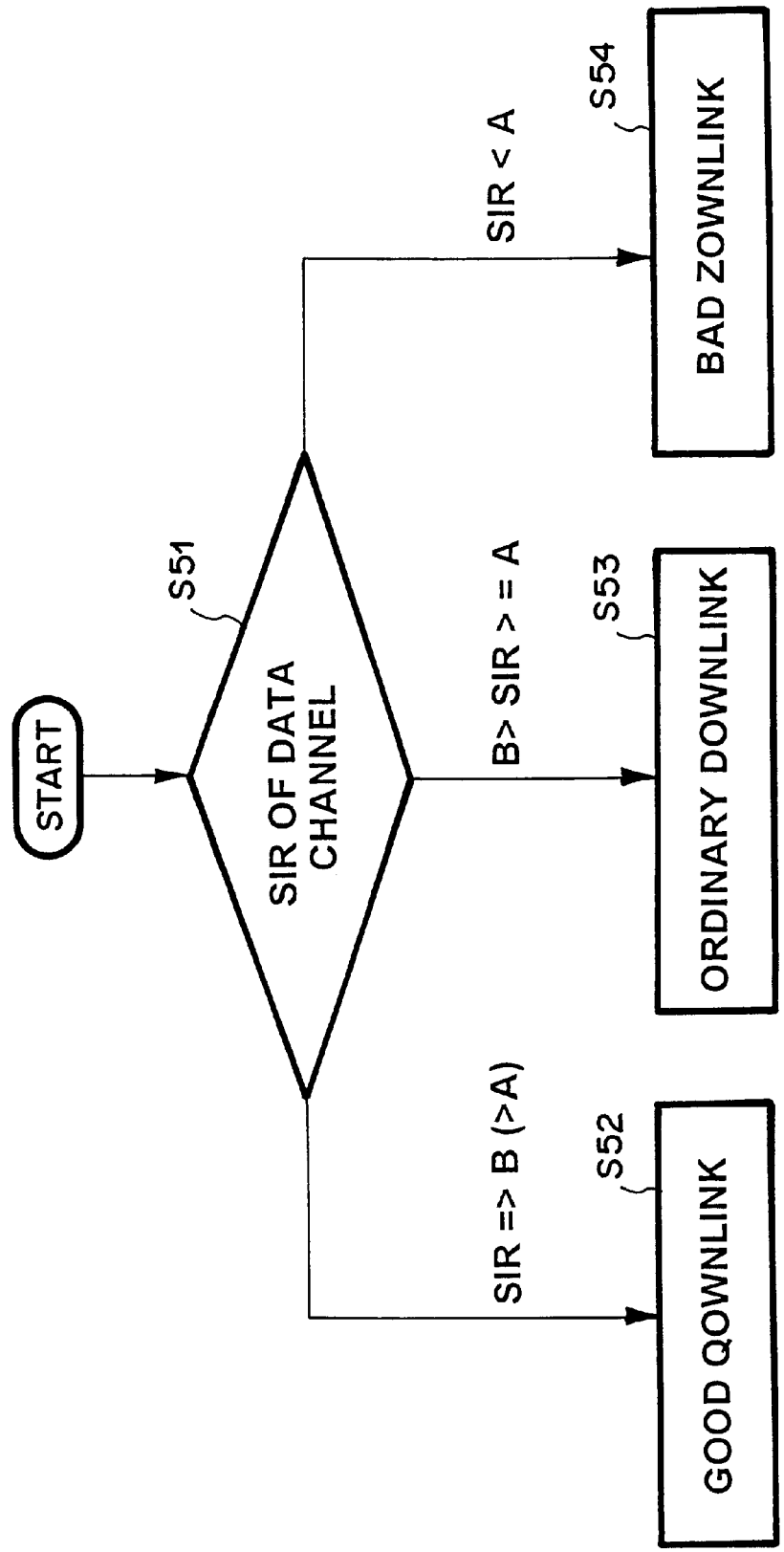

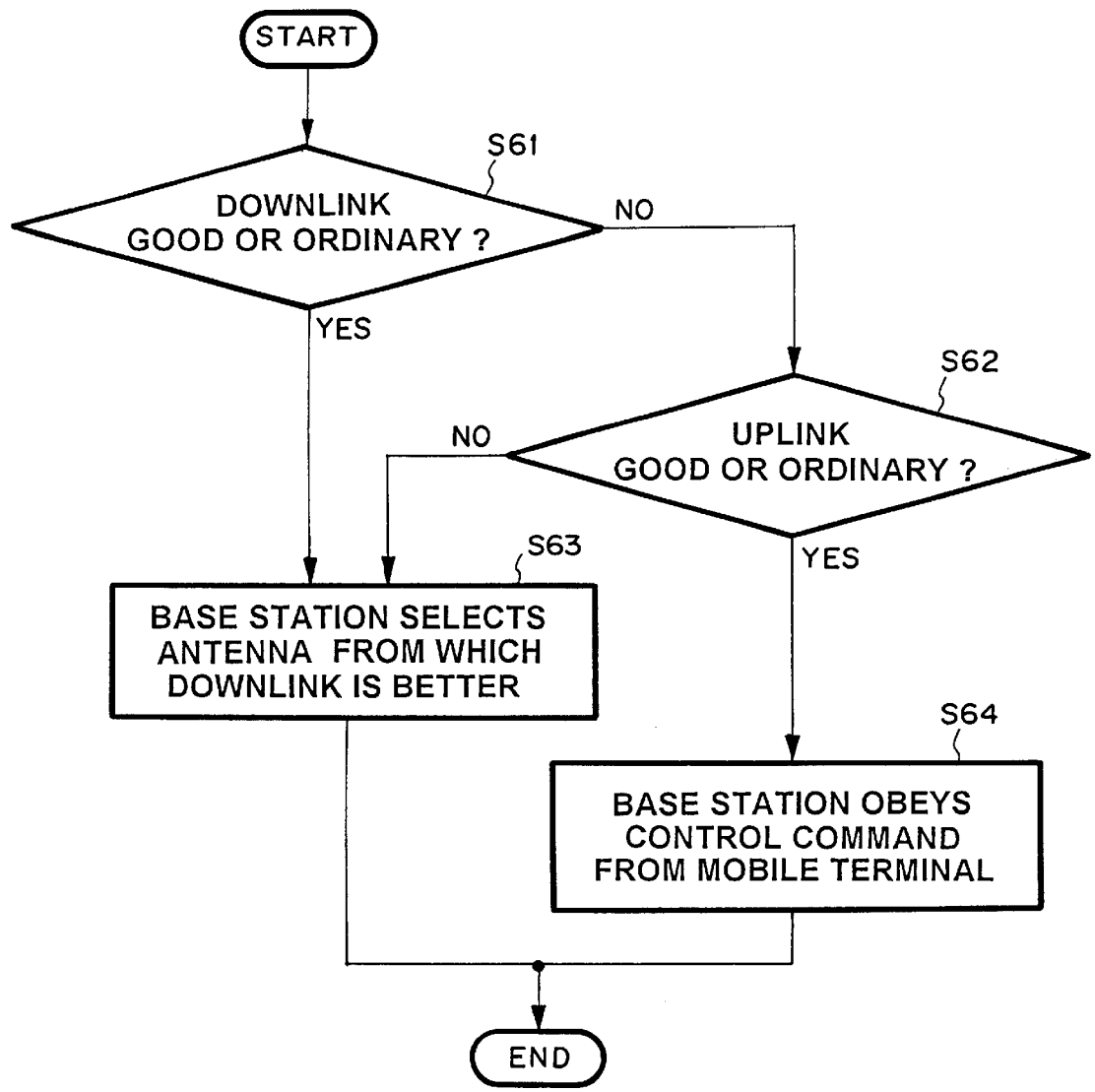

MOBILE TERMINAL FOR TRANSMISSION DIVERSITY CDMA COMMUNICATION SYSTEM

BACKGROUND OF THE INVENTION

1. Technical Field of the Invention

The present invention relates to mobile terminals such as digital land mobile radiotelephones and pocket telephones, and particularly to mobile terminals for code division multiple access (CDMA) or CDMA frequency division duplex (CDMA/FDD).

2. Description of the Prior Art

The diversity is used for overcoming the fading or a fluctuation of a level of received electromagnetic wave due to interference by the waves which propagate through various routes.

In the reception diversity, the strongest component is selected among the components received by a plurality of antennas, or several components are selectively combined.

Further, in the transmission diversity, electromagnetic waves are transmitted by a plurality of antennas of which directivities are different from each other.

Furthermore, in the time division duplex (TDD) wherein a single frequency is used for transmission and reception, the transmission diversity is executed by selecting an antenna by which the mobile station received the strongest wave and by transmitting by using the selected antenna.

However, the transmission diversity in the TDD can not be employed for the frequency division duplex (FDD), because the frequency for an upward link is different from that for a downward link in FDD, and therefore the upward fading is different from the downward fading.

Therefore, in FDD, the closed loop control is required for controlling a level and phase of the wave transmitted by a base station, on the basis of a control command from mobile stations. In this case, information symbols or pseudo noise codes are different antenna by antenna.

Concretely, 0.625 ms time slot is used in the closed loop control, thereby the mobile terminal's measuring propagation states from each antenna of the base station, and thereby the base station's determining an antenna for transmission, or transmission ratio and phases for each antenna. For example, antenna 1 may be selected on the basis of a command from a mobile terminal. Antenna 2 may be selected, when the mobile station prefers antenna 2. Thus, the base station changes the antenna after the slot next to the slot which instructs the antenna selection.

The ratio of transmission levels and phases of the transmission waves are also changed by the control command from the mobile station.

Furthermore, when four bits in a slot are available for the control command in a system wherein the control command is transmitted every four slots, one bit may be used for the transmission rate, while the three bits may be used for eight phases. Thus, the control command controls the base station precisely.

The transmission diversity as disclosed in JP 8-195703 A (1996) employs a plurality of orthogonal codes such as WALSH function in order to communicate with all the mobile stations. The mobile stations despread the signals from the base station, and select one of them or combine two or more of them. The transmission power can be reduced due to the transmission diversity.

In the CDMA/TDD accompanied by TDMA as disclosed in JP 11-275035 A (1999), a sub-frame consisting of a plurality of slots is used for CDMA/TDD-TDMA, in order to maintain controllability of transmission power and transmission diversity. Concretely, the mobile terminal is provided with a signal interference ratio (SIR) measurement unit for monitoring a notification channel in the downward channel, while the base station is provided with a transmission power control unit for controlling the upward transmission power on the basis of the measurement result by an SIR measurement unit. Here, for example, an asymmetric communication by CDMA/TDD is executed by using one slot for the upward and three slots for the downward. In this case, all the sub-frames consisting of four slots allocated for all the users are transmitted by TDMA.

However, the base station may possibly confuse the control command from the mobile terminal, when the upward link is not in a good condition. For example, the base station may execute a transmission by using antenna 2, in spite of the command from the mobile terminal which orders the base station to use antenna 1. In this case, communication qualities may become worse.

On the other hand, when the downward link is not in a good condition, the mobile terminal may not recognize correctly the transmission channel, even when the base station works according to the control command. For example, the mobile station may recognize that the base station executes a transmission by antenna 2, in spite of the fact that the base station is using antenna 1. As a result, the mobile terminal can not demodulate the signal from the base station, because information symbol or pseudo random code differs antenna by antenna.

SUMMARY OF THE INVENTION

An object of the present invention is to control the transmission diversity by monitoring the upward and downward link.

The mobile terminal of the present invention transmits a control command for controlling a base station with transmission diversity by using two or more antennas, thereby enjoying a good downward link. The mobile terminal of the present invention includes:

a reception unit for receiving downward signal from the base station;

a channel estimation unit for estimating a downward channel on the basis of received downward signal;

a channel prediction unit for predicting a downward channel which is used at the time when the base station is controlled by the control command;

a control command generation unit for generating the control command on the basis of the predicted downward channel;

a mixer unit for mixing the generated control command and information data from the mobile terminal; and a transmission unit for transmitting the output from the mixer unit.

The mobile terminal of the present invention receives signals from the base station which receives the control command from the mobile terminal and executes on the basis of the control command the transmission diversity by using two or more antennas, thereby enjoying a good downward link. The mobile terminal of the present invention includes:

a reception unit for receiving downward signal from the base station;

a downward link estimation unit for estimating the downward channel on the basis of the received downward signal;

an upward link estimation unit for estimating the upward channel on the basis of the received downward signal;

a base station estimation unit for estimating a state of the base station on the basis of the outputs from the downward estimation unit and the upward estimation unit; and a demodulator unit for demodulating the received signal on the basis of the output from the base station estimation unit.

The downward link estimation unit in the mobile terminal of the present invention estimates the downward link on the basis of a signal level, or SIR of the received signal.

The upward link estimation unit in the mobile terminal of the present invention estimates the upward link on the basis of a transmission power control command from the base station.

The base station estimation unit in the mobile terminal of the present invention on the basis of the estimated downward link, when the downward link is in a good condition and the upward link is in a bad condition. On the contrary, the base station estimation unit estimates that the base station executes a transmission in accordance with the control command from mobile terminal, when the downward link is in a bad condition and the upward link is in a good condition.

According to the present invention, The transmission state of the base station can be grasped correctly, even when the upward link and/or downward link is in a bad condition. Therefore, the mobile terminal receives good quality signals and enjoys a merit of the transmission diversity.

BRIEF EXPLANATION OF THE DRAWINGS

FIG. 4 is a flow chart for estimating the upward link.

FIG. 5 is a flow chart for estimating the downward link.

FIG. 6 is a flow chart for estimating a transmission state of the base station.

PREFERRED EMBODIMENT OF THE INVENTION

Figure 1:
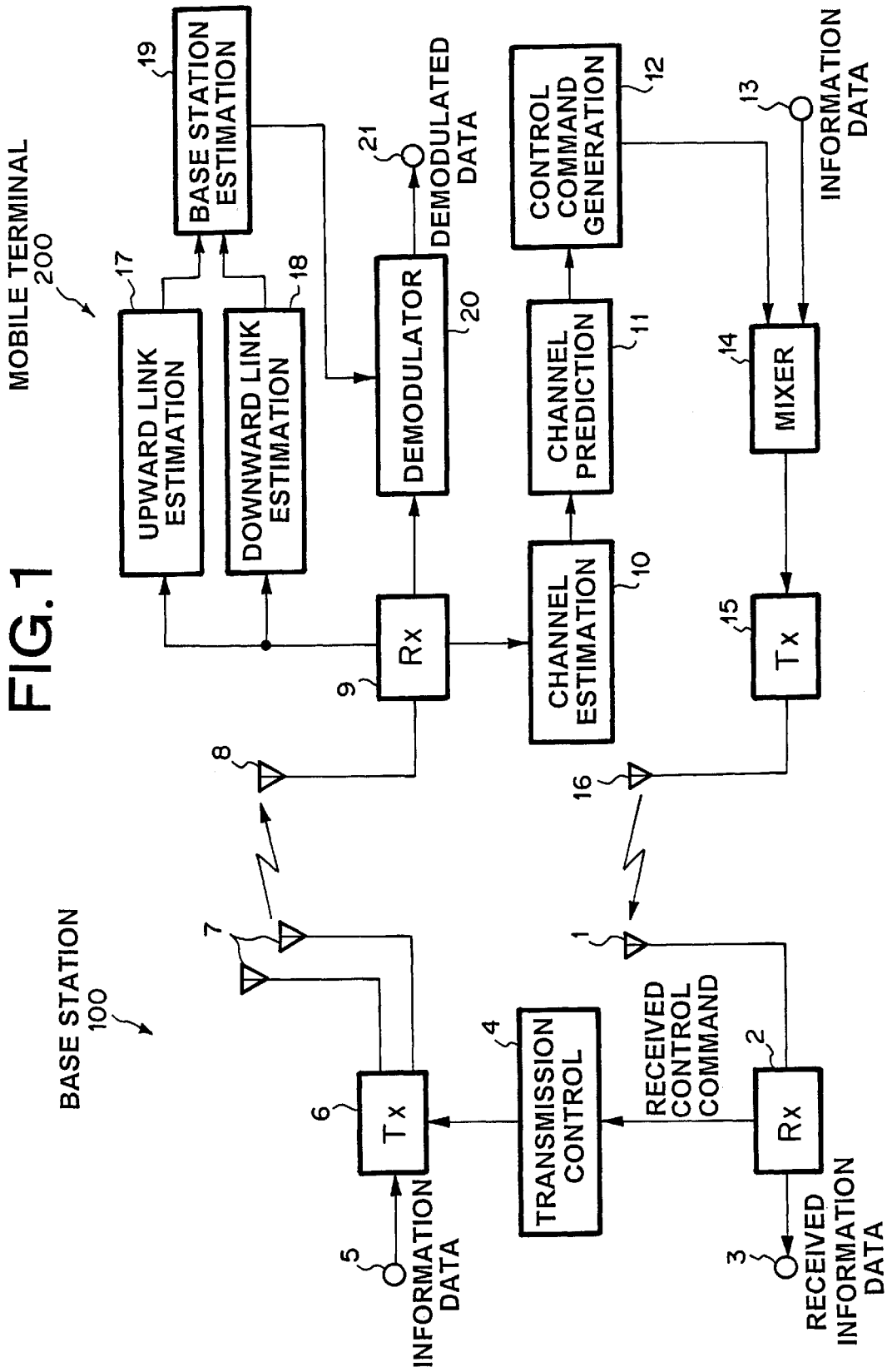
FIG. 1 is a block diagram of a CDMA mobile communication system including the mobile terminal of the present invention.

FIG. 1 is a block diagram of a mobile communication system which comprises base station 100 and mobile station 200 of the present invention.

Base station as shown in FIG. 1 comprises transmission unit (Tx) 6 for modulating information signal inputted from input terminal 5 into CDMA signal, transmission antenna 7 for transmitting the output from Tx 6, reception antenna 1 for receiving signals from a plurality of mobile terminals, reception unit (Rx) 2 for outputting through a radio frequency amplifier, band pass filter and intermediate frequency amplifier, information data received by antenna 1. Rx 2 also generates a reception control command on the basis of a signal interference ratio (SIR) and outputs the reception control command to transmission control unit 4.

Mobile terminal 200 comprises reception antenna 8, reception unit (Rx) 9 for converting the radio frequency signal into a base band signal, upward link estimation unit 17 for estimating the upward channel on the basis of reception level, SIR, or SIN received by Rx 9, downward link estimation unit 18 for estimating the downward channel on the basis of reception level, SIR, or SIN received by Rx 9, base station estimation unit 19 for estimating the transmission state of the base station on the basis of the outputs from upward link estimation unit 17 and downward estimation unit 18, demodulator 20 for demodulating the base band signal on the basis of the output from base station estimation unit 19. A bit error rate of the output from demodulator 20 may also be used for generating a control command, although demodulator 20 is not connected with control command generating unit 12, in FIG. 1.

Mobile terminal 200 further comprises channel estimation unit 10 for estimating an optimum transmission channel on the basis of reception level, SIR or S/N received by Rx 9, channel prediction unit 11 for predicting an optimum channel for the next slot on the basis of the output from channel estimation unit, control command generation unit 12 for generating commands for controlling base station 100 on the basis of the output from channel prediction unit 11, mixer unit 14 for mixing the control command from control command generation unit 12 and transmission information data from output terminal 13, transmission unit (Tx) 15 for modulating the output from mixer unit 14 into CDMA signal, and transmission antenna 16 for transmitting the CDMA signal from Tx 15.

It is assumed that base station 100 uses two transmission antenna, and transmission symbol sequence in the control channel for the first transmission antenna is "0011", while the symbol sequence for the second antenna is "0101".

The control channel signal on downward link from Rx 9 is averaged over a prescribed period such as one slot period (0.625 ms) by channel estimation unit 10. Channel prediction unit 11 predicts the downward channel from the first and second antennas on the basis of the estimation value obtained by channel estimation unit 10.

Figure 2:
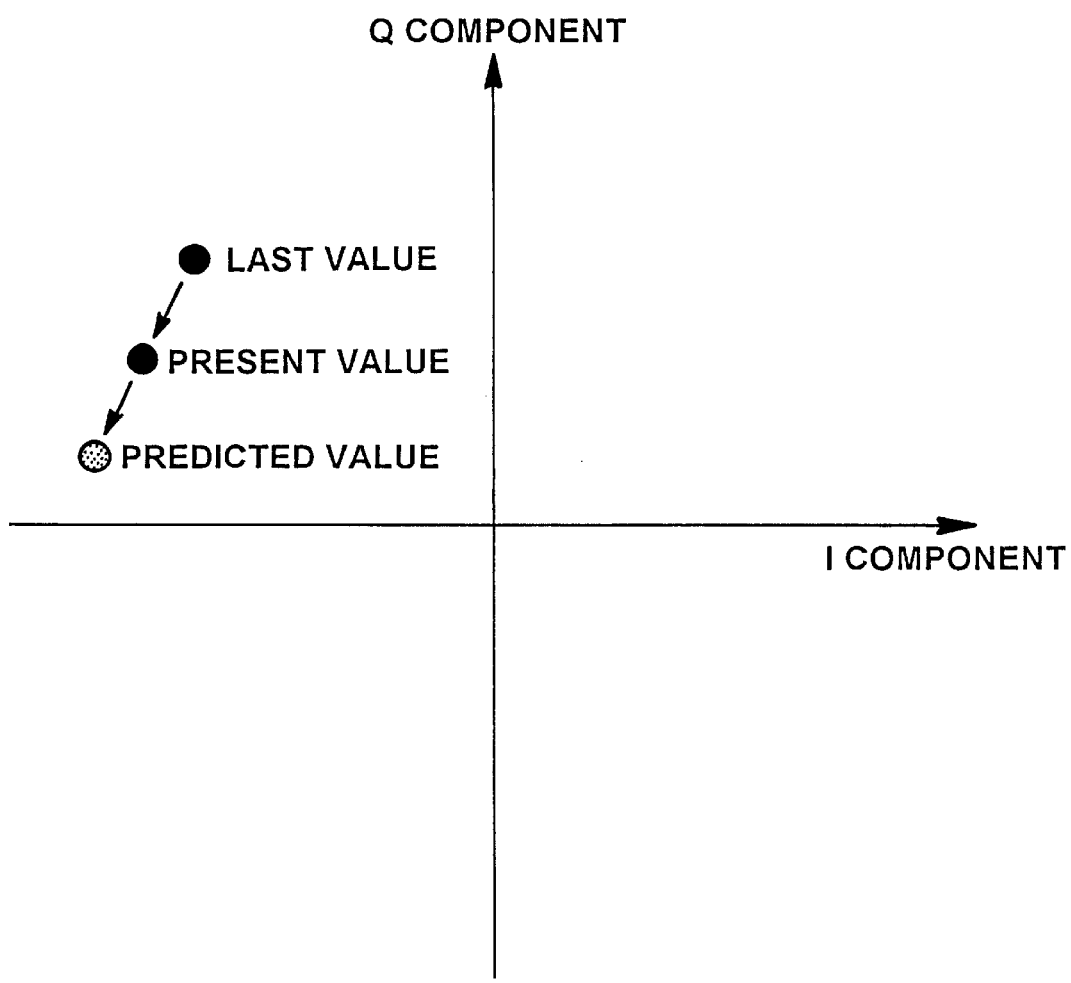
FIG. 2 is an illustration for explaining an estimation method executed by the channel estimation unit in the mobile terminal on the present invention.
Figure 3:
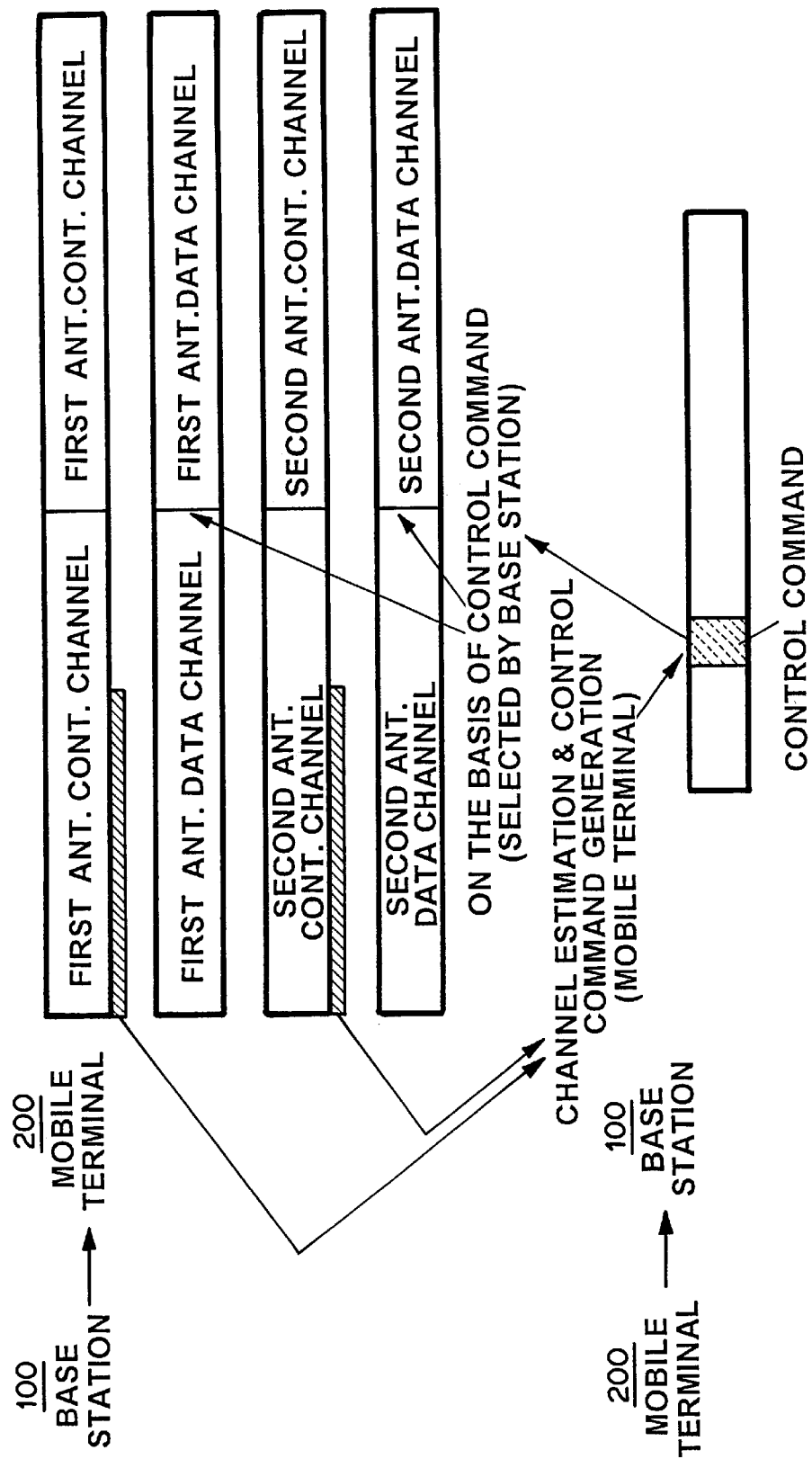
FIG. 3 is a timing chart of downward link and upward link.

It is assumed that it takes one slot period to deliver the control command to base station 100, as shown in FIG. 3. Channel prediction unit 11 may predict the channel value by an extrapolation by using the present slot and the last slot. Channel value may be expressed by a coordinate (I,Q), where I is an In-phase component and Q is a Quadrature-phase component, as shown in FIG. 2.

Two or more slots may be employed for the prediction.

Then, control command generation unit 12 generates a control command for base station 100. For example, the control command may designate an antenna which is in a better condition. Further, control command may instruct the best phase difference between the transmission antennas among every possible phase differences, so as to maximize the combined level.

The control command generated by control command generation unit 12 is supplied together with the information data from output terminal 13 to Tx 15 through mixer unit 14. Tx 15 transmits through antenna 16 a spread spectrum signal of the output from mixer 14.

Base station 100 receives through antenna 1 the spread spectrum signal on the upward link, and despreads it, thereby outputting the information data to output terminal 3 and outputting the control command to transmission control unit 4. Transmission control unit 4 instructs transmission levels and phases for the transmission antennas on the basis of the control command which is periodically supplied by mobile terminal 200. Transmission unit 6 transmission information data on the data channel the conditions instructed by transmission control unit 4.

Rx 9 in mobile terminal 200 receives through reception antenna 8 the signal on the data channel. The received signal is fed into upward link estimation unit 17 and downward link estimation unit 18.

Upward link estimation unit 17 reads out a power control command from base station 100. In general, The power control command is such that the transmission power from mobile terminal 200 be decreased, when the upward link observed by base station 100 is in a good condition. On the contrary, the power control command is such that the transmission power from mobile terminal 200 be increased, when the upward link observed by base station 100 is in a bad condition. Therefore, 2 bit command may be used for decreasing, increasing or maintaining the transmission power from mobile terminal 200. Three bit command may well be used for the power control.

The power control command instructing a decrease in the transmission power from mobile terminal is sent repeatedly from base station, when the upward link is in a very good condition, while the power control command instructing an increase in the transmission power is sent repeatedly from base station 100, when the upward link is in a very bad condition.

FIG. 4 is an exemplary flow chart for estimating the upward link. At first at S41, it is determined whether the control bit instructs an increase or decrease in transmission power. If the command bit instructs a decrease in the transmission power, then, it is determined whether the decrease command is received repeatedly more than three times at S42. If the decrease command is received repeatedly more than three times, then, the upward link is estimated to be in a good condition at S44. On the other hand, if it is determined at S42 that the decrease command is not received repeatedly more than three times, the upward link is estimated to be in an ordinary condition. If the command bit instructs an increase in the transmission power at S41, then, it is determined whether the increase command is received repeatedly more than three times at S43. If the increase command is received repeatedly more than three times, then, the upward link is estimated to be in a bad condition at S46. On the other hand, if it is determined at S43 that the increase command is not received repeatedly more than three times, the upward link is estimated to be in an ordinary condition. The upward link may be represented by 7 level by using three bits command. Further, the upward link is estimated by an average of the levels.

Downward link estimation unit 18 estimates the downward link on the basis of reception level, or SIR on data channel or control channel on the downward link.

FIG. 5 is an exemplary flow chart for estimating the downward link, by using two threshold A and B (>A). At first at S51, SIR is measured in a data channel. If SIR is greater than or equal to threshold B, then the downward link is estimated in a good condition at S52. If SIR is smaller than threshold A, then the downward link is estimated in a bad condition at S54. If SIR is greater than or equal to threshold A and smaller than threshold B, then the downward link is estimated in an ordinary condition at S53. three or more thresholds may be employed for the downward link estimation.

Base station estimation unit 19 estimates the transmission state of base station 100 on the basis of the estimated upward link and estimated downward link. Concretely, The state of base station 100 is estimated on the basis of the estimated downward link, when the downward link is in a good condition and the upward link is in a bad condition. On the contrary, mobile terminal expects that base station 100 executes a transmission in accordance with the control command from mobile terminal 200, when the downward link is in a bad condition and the upward link is in a good condition.

FIG. 6 is an exemplary flow chart for estimating the state of base station 100. At first at S61, it is determined whether the downward link is in a good condition or in an ordinary condition. If the downward link is in a good condition or in an ordinary condition, then, mobile terminal expects at S63 that base station 100 is using an antenna from which the greater reception level is obtained by mobile terminal. If the downward link is in a bad condition, it is determined at S62 whether the upward link is in a good condition or in an ordinary condition. If the upward link is in a good condition or in an ordinary condition, then, mobile terminal expects at S64 that base station 100 is executing a transmission in accordance with the control command on the upward link. If both the downward link and upward link are in bad conditions, then, mobile terminal expects at S63 that base station 100 is using an antenna from which the greater reception level is obtained by mobile terminal.

The above-explained estimation method can be applied not only antenna switching diversity, but also transmission power ratio control or phase difference control for the transmission antennas.

As shown in FIG. 1, demodulation unit 20 demodulates the received signal on the basis of the transmission state outputted from base station estimation unit 19. When the antenna switching transmission diversity is employed as shown in FIG. 1, mobile terminal estimates transmission channels by using the control channel and data channel from the antenna which is expected to be used by base station 100, and demodulates the data channel from the antenna which is used by base station 100.

What is claimed is:

1. A mobile terminal which transmits a control command to a base station which is provided with two or more antennas for transmission diversity, which comprises:

a reception unit for receiving a downward signal from said base station;

a downward link estimation unit for estimating said downward link on the basis of said downward signal;

an upward link estimation unit for estimating said upward link on the basis of said downward signal;

a base station estimation unit for estimating a transmission state of said base station on the basis of the outputs from said downward estimation unit and said upward estimation unit; and a demodulator unit for demodulating said downward signal on the basis of the output from said base station estimation unit, wherein said base station estimation unit estimates said transmission state of said base station on the basis of said downward link estimated by said down link estimation unit, when said downward link is in a good condition and said upward link is in a bad condition, while said base station estimation unit estimates that said base station executes a transmission in accordance with said control command from mobile terminal, when said downward link is in a bad condition and said upward link is in a good condition.

2. The mobile terminal according to claim 1, wherein said base station estimation unit estimates said transmission state of said base station on the basis of said downward link estimated by said down link estimation unit, when said downward link is in a bad condition and said upward link is in a bad condition.

* * * * *